United States Patent
Palaskas et al.

(10) Patent No.: US 7,609,792 B2
(45) Date of Patent: Oct. 27, 2009

(54) MULTIPLE-INPUT MULTIPLE-OUTPUT MULTICHIP TRANSCEIVER WITH CORRELATED CLOCK SIGNALS

(75) Inventors: Georgios Palaskas, Portland, OR (US); Ashoke Ravi, Hillsboro, OR (US); Soumyanath Krishnamurthy, Portland, OR (US); Richard B. Nicholls, Banks, OR (US); Keith A. Holt, El Dorado Hills, CA (US); Stanley K. Ling, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 550 days.

(21) Appl. No.: 11/069,172

(22) Filed: Mar. 1, 2005

(65) Prior Publication Data
US 2006/0198476 A1  Sep. 7, 2006

(51) Int. Cl.
*H04B 7/10* (2006.01)
(52) U.S. Cl. ......................... 375/347; 370/335; 370/503; 375/219; 375/345; 375/376; 375/267; 455/333; 455/450; 455/550.1; 327/199; 327/259

(58) Field of Classification Search ................. 375/267, 375/347
See application file for complete search history.

(56) References Cited

U.S. PATENT DOCUMENTS

| | | | | |
|---|---|---|---|---|
| 7,068,705 | B2 * | 6/2006 | Schilling | 375/141 |
| 7,072,413 | B2 * | 7/2006 | Walton et al. | 375/267 |
| 2005/0064892 | A1 * | 3/2005 | Cavin | 455/550.1 |
| 2005/0189978 | A1 * | 9/2005 | Truong et al. | 327/259 |
| 2006/0045198 | A1 * | 3/2006 | Magee et al. | 375/267 |
| 2006/0109927 | A1 * | 5/2006 | Magee et al. | 375/267 |
| 2007/0032241 | A1 * | 2/2007 | Busch et al. | 455/450 |

* cited by examiner

*Primary Examiner*—Shuwang Liu
*Assistant Examiner*—Dhaval Patel
(74) *Attorney, Agent, or Firm*—Schwegman, Lundberg & Woessner, P.A.; Gregory J. Gorrie (57) ABSTRACT

A multichip transceiver operates as part of a multiple-input multiple-output communication system. First receiver circuitry on a first integrated circuit processes radio-frequency (RF) signals received from a first signal source, and second receiver circuitry on a second integrated circuit processes RF signals received from a second signal source. Clock-signal generating circuitry provides clock signals through phase-matched paths to the first and second receiver circuitry.

24 Claims, 3 Drawing Sheets

MULTIPLE-INPUT MULTIPLE-OUTPUT MULTICHIP TRANSCEIVER WITH CORRELATED CLOCK SIGNALS

TECHNICAL FIELD

Embodiments of the present invention pertain to wireless communications. Some embodiments pertain to multicarrier communications. Some embodiments pertain to multiple-input multiple-output (MIMO) communication systems.

BACKGROUND

Receivers that downconvert and process signals received through different signal paths may require phase-matched local-oscillator (LO) frequencies, especially when further processing and/or combining is performed on the baseband signals. The different signal paths, for example, may correspond to different receive antennas. Similarly, transmitters that transmit signals using different antennas may also require phase-matched LO frequencies.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
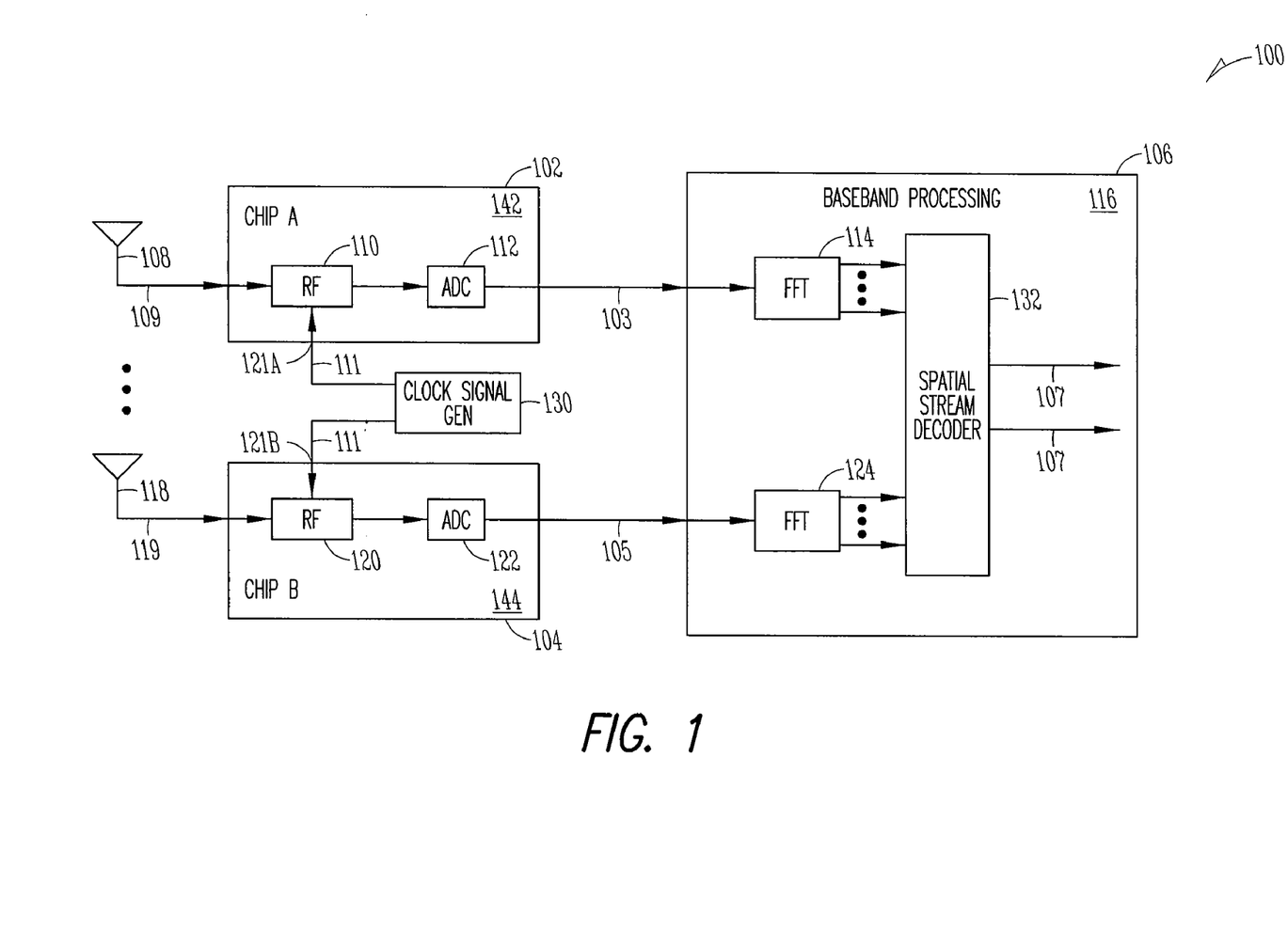
FIG. 1 is a block diagram of a receiver in accordance with some embodiments of the present invention.

FIG. 1 is a block diagram of a receiver in accordance with some embodiments of the present invention. Receiver 100 may receive signals through two or more antennas 108, 118 and may generate corresponding baseband signals 103 and 105. In some embodiments, receiver 100 may operate as part of a multiple-input multiple-output (MIMO) communication system which takes advantage of antenna diversity to communicate two or more spatial data streams. In some embodiments, receiver 100 may be part of a transceiver. In some of these embodiments, multicarrier receiver 100 may receive the two or more data streams concurrently through two or more antennas and may generate the two or more data streams by baseband processing circuitry 116 by combining and/or weighting contributions from each antenna. The two or more data streams generated by baseband processing circuitry 116 may correspond to the two or more data streams that were originally transmitted by a transmitting station.

In some embodiments, receiver 100 may receive a single data stream concurrently through two or more antennas and may generate a single data stream by baseband processing circuitry 116 by combining and/or weighting contributions from each antenna with appropriate processing. These embodiments may allow for increased data communication rates and/or increased communication range, although the scope of the invention is not limited in this respect.

In order for receiver 100 to accurately process signals received through more than one signal source, the local-oscillator (LO) signals used by the receiver circuitry should be substantially synchronized with each other. Synchronizing LO signals is difficult when the receiver circuitry is located on different integrated circuits because clock correlation is difficult to obtain with multiple synthesizers. In accordance with some embodiments of the present invention, receiver 100 comprises clock-signal generating circuitry 130 to provide synchronized clock signals 111 through matched paths to first and second receiver circuitry 142, 144. In some embodiments, clock-signal generating circuitry 130 may provide synchronized phase-matched clock signals 111 through-matched paths to first and second receiver circuitry 142, 144. Matched paths that provide synchronized clock signals 111 may be substantially the same length, as discussed in more detail below. In some embodiments, first and second receiver circuitry 142, 144 may include LO control ports 121 to receive synchronized phase-matched clock signals 111.

In these embodiments, first receiver circuitry 142 may be located on first integrated circuit 102 and may process radio-frequency (RF) signals received from first signal source 108. Second receiver circuitry 144 may be located on second integrated circuit 104 and may process RF signals received from second signal source 118. Various embodiments of clock-signal generating circuitry 130 are described in more detail below. In some embodiments, the first and second signal sources comprise antennas 108 and 118.

In some embodiments, baseband processing circuitry 116 may generate one or more output data streams 107 from baseband signals 103, 105 provided by both first and second receiver circuitry 142, 144. In some embodiments, baseband processing circuitry 116 may combine signals from first and second receiver circuitry 142, 144 to generate two or more data streams 107. In these embodiments, the two or more data streams may have been simultaneously transmitted by a multiple-output transmitting station with two or more antennas, although the scope of the invention is not limited in this respect. In some embodiments, baseband processing circuitry 116 may be on a third integrated circuit 106.

In some embodiments, clock-signal generating circuitry 130 may generate clock signals 111 from a common reference and first and second receiver circuitry 142, 144 may generate substantially matched LO frequencies from matched clock signals 111 for use in processing the received RF signals. In some embodiments, the common reference may be provided by a signal source such as an off-chip crystal discussed in more detail below.

In some embodiments, baseband processing circuitry 116 comprises first Fourier transform circuitry 114 to generate frequency-domain symbol-modulated subcarriers from first baseband signal 103 provided by first receiver circuitry 142. In these embodiments, baseband processing circuitry 116 may also comprise second Fourier transform circuitry 124 to generate frequency-domain symbol-modulated subcarriers from second baseband signal 105 provided by the second receiver circuitry 144. Baseband processing circuitry 116 may also comprise circuitry, such as spatial stream decoder 132, to combine and/or weight the frequency-domain symbol-modulated subcarriers from both Fourier transform circuitries 114, 124 to generate one or more data streams 107. The one or more data streams 107 may have been originally transmitted by a transmitting station, although the scope of the invention is not limited in this respect.

In some embodiments, first receiver circuitry 142 may comprise first RF circuitry 110 to downconvert RF signals 109 from the first signal source and first analog-to-digital conversion (ADC) circuitry 112 to digitize the downconverted signals to generate first baseband signal 103. In these embodiments, second receiver circuitry 144 comprises second RF circuitry 120 to downconvert RF signals 119 from the second signal source and second ADC circuitry 122 to digitize the downconverted signals to generate second baseband signal 105. First RF circuitry 110 and second RF circuitry 120 may generate phase-matched LO frequencies from matched clock signals 111 for use in downconverting the received RF signals.

In some MIMO embodiments that communicate two spatial data streams, it should be noted that the two output data streams 107 generated by baseband processing circuitry 116 do not correspond respectively to the two baseband signals 103 and 105. In these embodiments, the two output data streams 107 may be generated by baseband processing circuitry 116 from both baseband signals 103 and 105. In these embodiments, the two output data streams 107 may correspond to two transmitted spatial data streams by a transmitting station. In some embodiments, baseband processing circuitry 116 may combine the two output data streams 107 to generate a single bit stream for subsequent decoding, although the scope of the invention is not limited in this respect.

Although receiver 100 is illustrated as having two antennas 108, 118 with associated receiver circuitry 142, 144, in other embodiments, receiver 100 may use more than two antennas and associated receiver circuitry to generate additional baseband signals associated with the additional antennas. These additional baseband signals may be provided to baseband processing circuitry 116 for processing with baseband signals 103, 105 to generate one or more output data streams 107.

Although receiver 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of receiver 100 may refer to one or more processes operating on one or more processing elements. Although ADC circuitry 112 and 122 are illustrated respectively as part of receiver front-end circuitry 142 and 144, in some embodiments, ADC circuitry 112 and 122 may be part of baseband processing circuitry 116.

In some embodiments, receiver 100 may be part of a wireless communication device, a receiving station and/or a transmitting station that may transmit multicarrier communication signals, such as orthogonal frequency division multiplexed (OFDM) communication signals. In some embodiments, receiver 100 may receive multicarrier signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, the frequency spectrums for a multicarrier communication signal may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, receiver 100 receive RF communications transmitted in accordance with specific communication standards, such as the Institute of Electrical and Electronics Engineers (IEEE) standards including IEEE 802.11 (a), 802.11(b), 802.11(g), 802.11 (h) and/or 802.11 (n) standards for wireless local area networks (WLANs), although receiver 100 may also be suitable to receive communications in accordance with other techniques including the Digital Video Broadcasting Terrestrial (DVB-T) broadcasting standard, and the High performance radio Local Area Network (HiperLAN) standard. In some broadband and WiMax embodiments, receiver 100 may receive broadband wireless communications in accordance with the IEEE 802.16(e) standards for wireless metropolitan area networks (WMANs), although the scope of the invention is not limited in this respect.

In some embodiments, receiver 100 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly. In some broadband and WiMax embodiments, receiver 100 may be part of a receiving and/or transmitting station, although the scope of the invention is not limited in this respect.

Antennas 108 and 118 may comprise one or more directional or omnidirectional antennas, including, for example, dipole antennas, monopole antennas, patch antennas, loop antennas, microstrip antennas or other types of antennas suitable for reception of RF signals.

In some embodiments, clock-signal generating circuitry 130 may be used as part of a multiple-input multiple-output transceiver. In some of these embodiments, clock-signal generating circuitry 130 may also be used as part of a multiple-output transmitter. In these embodiments, clock-signal generating circuitry 130 may generate phase-matched clock signals 111 for use by transmitter circuitry to generate phase-matched LO signals for use in simultaneously transmitting two or more signals by a corresponding two or more transmit antennas.

Figure 2:
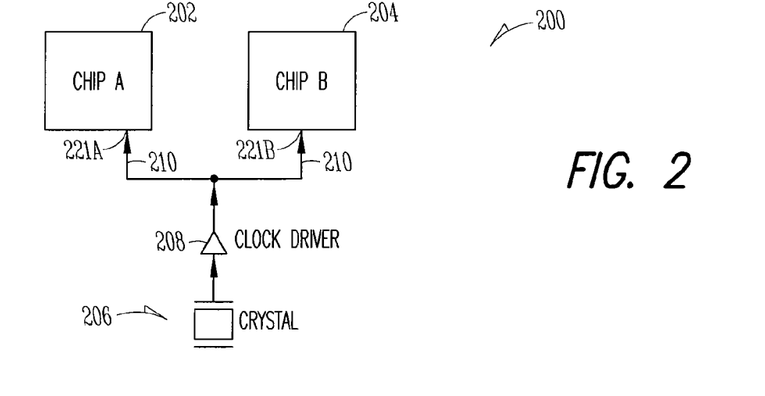
FIG. 2 is a block diagram of clock-signal generating circuitry in accordance with some embodiments of the present invention.

FIG. 2 is a block diagram of clock-signal generating circuitry in accordance with some embodiments of the present invention. Clock-signal generating circuitry 200 may be suitable for use as clock-signal generating circuitry 130 (FIG. 1). In these embodiments, first integrated circuit 202 may correspond to first integrated circuit 102 (FIG. 1) and second integrated circuit 204 may correspond to second integrated circuit 104 (FIG. 1). Clock-signal generating circuitry 200 may comprise clock driver 208 to receive and/or amplify signals from crystal 206, and matched signal paths 210 to provide the clock signals from clock driver 208 to LO control ports 221A and 221B of first and second integrated circuits 202, 204. In some embodiments, clock driver 208 may be on a different chip than the first and second receiver circuitry, although the scope of the invention is not limited in this respect. LO control ports 221A and 221B may correspond respectively to LO control ports 121A and 121B (FIG. 1). In some embodiments, matched paths 210 may be substantially the same length.

Although clock driver 208 is illustrated as external to integrated circuits 202 and 204, in some embodiments, it may be included within one of the integrated circuits. In some embodiments, clock driver 208 may be part of integrated circuit 106 (FIG. 1).

Figure 3:
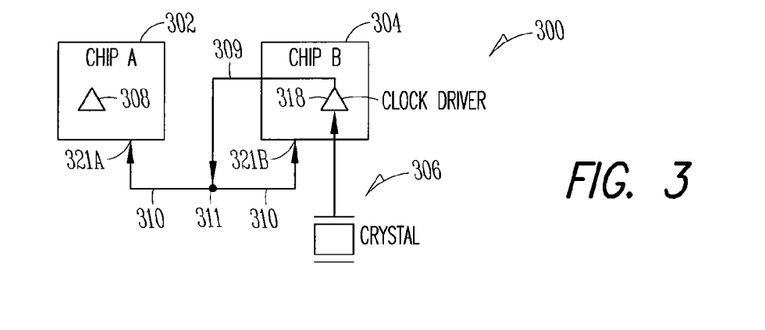
FIG. 3 is a block diagram of clock-signal generating circuitry in accordance with some embodiments of the present invention.

FIG. 3 is a block diagram of clock-signal generating circuitry in accordance with some embodiments of the present invention. Clock-signal generating circuitry 300 may be suitable for use as clock-signal generating circuitry 130 (FIG. 1). In these embodiments, first integrated circuit 302 may correspond to first integrated circuit 102 (FIG. 1) and second integrated circuit 304 may correspond to second integrated circuit 104 (FIG. 1). Clock-signal generating circuitry 300 may comprise clock driver 318 on second integrated circuit 304 to receive signals from crystal 306, and clock driver output signal path 309 to provide a clock signal output from clock driver 318 to off-chip junction 311. In these embodiments, clock-signal generating circuitry 300 also comprises matched signal paths 310 to provide the clock signals from junction 311 to LO control ports 321A and 321B of first and second integrated circuits 302, 304. In some embodiments, junction 311 is located on neither the first nor the second integrated circuits 302, 304. In some of these embodiments, when first and second integrated circuits 302 and 304 are identical, first integrated circuit 302 may include an unused clock driver 308 which may be disabled, although the scope of the invention is not limited in this respect. LO control ports 321A and 321B may correspond respectively to LO control ports 121A and 121B (FIG. 1).

As illustrated in FIG. 3, the output of clock driver 318 is split in two paths that may go to individual receivers. The split may be provided at a point so that the matched paths 310 thereafter are symmetric by construction. In some embodiments, matched paths 310 may be substantially the same length. One advantage to these embodiments is that a separate clock driver chip may not be required.

Figure 4:
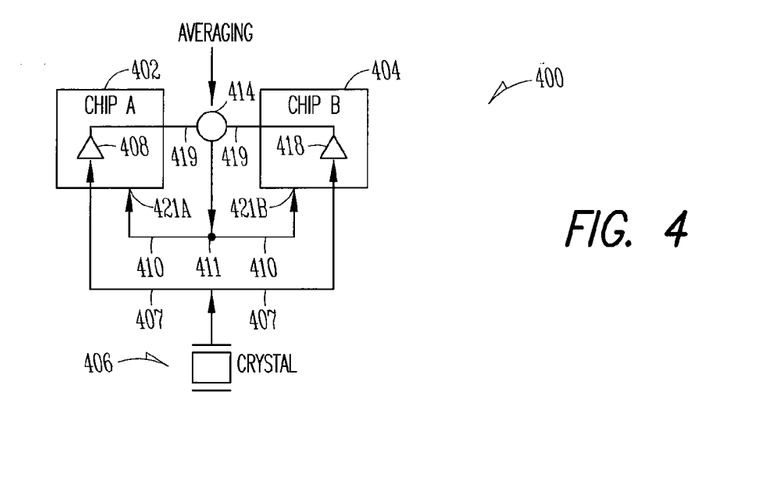
FIG. 4 is a block diagram of clock-signal generating circuitry in accordance with some embodiments of the present invention.

FIG. 4 is a block diagram of clock-signal generating circuitry in accordance with some embodiments of the present invention. Clock-signal generating circuitry 400 may be suitable for use as clock-signal generating circuitry 130 (FIG. 1). In these embodiments, first integrated circuit 402 may correspond to first integrated circuit 102 (FIG. 1) and second integrated circuit 404 may correspond to second integrated circuit 104 (FIG. 1). Clock-signal generating circuitry 400 may comprise first clock driver 408 on first integrated circuit 402 to receive signals from crystal 406, and second clock driver 418 on second integrated circuit 404 to also receive the signals from crystal 406. Clock-signal generating circuitry 400 may also comprise averaging element 414 to combine output signals from first and second clock drivers 408, 418 and provide a clock signal output to junction 411. Matched signal paths 410 may provide the clock signals from junction 411 to LO control ports 421A and 421B of first and second integrated circuits 402, 404. In some embodiments, matched signal paths 407 may couple crystal 406 to first and second clock drivers 408, 418. LO control ports 421A and 421B may correspond respectively to LO control ports 121A and 121B (FIG. 1). In some embodiments, matched paths 410 may be substantially the same length.

In some embodiments, averaging element 414 may be off-chip and may comprise one or more resistors to combine and average currents from first and second clock drivers 408, 418. In some embodiments, averaging element 414 may be located on neither the first nor the second integrated circuits 402, 404. In some embodiments, junction 411 may be located off-chip on neither the first nor the second integrated circuits 402, 404.

In some embodiments, clock drivers 208 (FIG. 2), 308 & 318 (FIG. 3), 408 & 418 (FIG. 4) may be buffers, although the scope of the invention is not limited in this respect. In some embodiments, crystals 206, 306 and 406 may be off-chip crystals, although the scope of the invention is not limited in this respect. Although FIGS. 2, 3, and 4 illustrate clock-signal generating circuitry for generating two matched clock signals, the scope of the invention is not limited in this respect. In some embodiments that receive signals through more than two antennas, more than two matched clock signals may be similarly generated.

Figure 5:
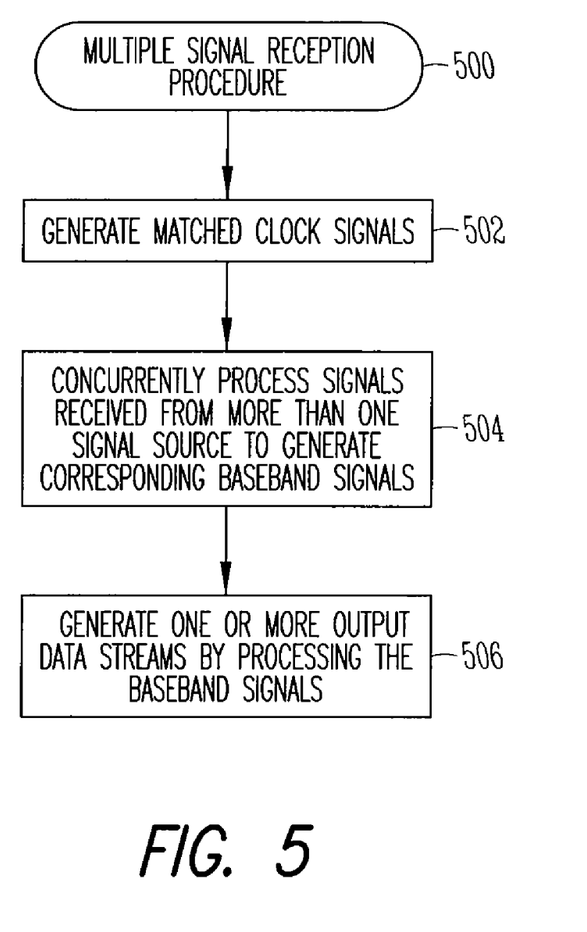
FIG. 5 is a procedure for receiving signals in accordance with some embodiments of the present invention.

FIG. 5 is a procedure for receiving signals in accordance with some embodiments of the present invention. Multiple signal reception procedure 500 may be performed by a receiver, such as receiver 100 (FIG. 1), although other receivers may also be suitable for performing procedure 500.

Operation 502 generates two or more matched clock signals. Operation 502 may be performed by clock-signal generating circuitry 130 (FIG. 1).

Operation 504 comprises concurrently processing signals received from more than one signal source to generate corresponding baseband signals using the matched clock signals generated in operation 502. In some embodiments, operation 504 may be performed by receiver front-end circuitry 142 and 144 (FIG. 1) located on different integrated circuits 102 and 104 (FIG. 1) based on clock signals 111 (FIG. 1) to generate baseband signals 103 and 105 (FIG. 1).

Operation 506 comprises generating one or more output data streams (e.g., bit streams) by processing the baseband signals generated in operation 504. In some embodiments, operation 506 may be performed by baseband processing circuitry 116 (FIG. 1) and may generate one or more output data streams 107 (FIG. 1) by combining signal contributions of each baseband signal.

Although the individual operations of procedure 500 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a computer. For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multichip receiver comprising:
   first receiver circuitry on a first integrated circuit to process first radio-frequency (RF) signals received from a first signal source;
   second receiver circuitry on a second integrated circuit to process second RF signals received from a second signal source; and
   clock-signal generating circuitry to provide phase-matched clock signals to the first and second receiver circuitry,
   wherein the clock-signal generating circuitry is to generate the clock signals from an off- chip crystal,
   wherein the first and second receiver circuitry generate substantially phase-matched local-oscillator frequencies from the phase-matched clock signals for use in processing the received RE signals,
   wherein the clock-signal generating circuitry comprises:
   a clock driver on either the first or the second integrated circuit to receive signals from the crystal;
   a signal path to provide an output from the clock driver to an off-chip junction; and
   matched signal paths to provide the clock signals from the junction to the first and second integrated circuits.

2. The receiver of claim 1 further comprising baseband processing circuitry to generate one or more output data streams from baseband signals provided by both the first and second receiver circuitry.

3. The receiver of claim 1 further comprising baseband processing circuitry to combine signals from the first and second receiver circuitry to generate two or more data streams, wherein the two or more data streams were simultaneously transmitted by a multiple-output transmitting station with two or more antennas.

4. The receiver of claim 3 wherein the baseband processing circuitry is on a third integrated circuit.

5. The receiver of claim 3 wherein the RF signals comprise orthogonal frequency division multiplexed communication signals having a plurality of orthogonal subcarriers, and wherein the first and second signal sources comprise antennas.

6. The receiver of claim 5 wherein the baseband processing circuitry comprises:
   first Fourier transform circuitry to generate frequency-domain symbol-modulated subcarriers from a first baseband signal provided by the first receiver circuitry;
   second Fourier transform circuitry to generate frequency-domain symbol-modulated subcarriers from a second baseband signal provided by the second receiver circuitry; and
   circuitry to combine the frequency-domain symbol-modulated subcarriers to generate one or more data streams that were separately transmitted by the transmitting station.

7. The receiver of claim 5 wherein the first receiver circuitry comprises first radio-frequency (RF) circuitry and first analog-to-digital conversion circuitry to downconvert the RF signals from the first source and generate a first baseband signal, and
   wherein the second receiver circuitry comprises second radio-frequency (RF) circuitry and second analog-to-digital conversion circuitry to downconvert the RF signals from the second source and generate a second baseband signal.

8. The receiver of claim 6 wherein the clock-signal generating circuitry is to generate the clock signals from the off-chip crystal,
   wherein the first and second receiver circuitry generate substantially phase-matched local-oscillator frequencies from the phase-matched clock signals for use in processing the received RF signals, and
   wherein the clock-signal generating circuitry comprises:
   a first clock driver on the first integrated circuit to receive signals from the crystal;
   a second clock driver on the second integrated circuit to receive signals from the crystal;
   an averaging element to combine output signals from the first and second clock drivers and provide a clock signal output to the off-chip junction; and
   a first pair of matched signal paths to provide the clock signals from the junction to the first and second integrated circuits.

9. A multichip receiver comprising:
   first receiver circuitry on a first integrated circuit to process first radio-frequency (RF) signals received from a first signal source;
   second receiver circuitry on a second integrated circuit to process second RF signals received from a second signal source; and
   clock-signal generating circuitry to provide phase-matched clock signals to the first and second receiver circuitry,
   wherein the clock-signal generating circuitry is to generate the clock signals from an off-chip crystal,
   wherein the first and second receiver circuitry generate substantially phase-matched local-oscillator frequencies from the phase-matched clock signals for use in processing the received RF signals,
   wherein the clock-signal generating circuitry comprises:
   a first clock driver on the first integrated circuit to receive signals from the crystal;
   a second clock driver on the second integrated circuit to receive signals from the crystal;
   an averaging element to combine output signals from the first and second clock drivers and provide a clock signal output to an off-chip junction; and a first pair of matched signal paths to provide the clock signals from the junction to the first and second integrated circuits.

10. The receiver of claim 9 further comprising a second pair of matched signal paths to couple the crystal to the first and second clock drivers, wherein the averaging element comprises resistors to combine and average currents from the first and second clock drivers and is located on neither the first nor the second integrated circuits, and wherein the junction is located on neither the first nor the second integrated circuits.

11. A method comprising:

processing first radio-frequency (RF) signals on a first integrated circuit received from a first signal source to generate a first baseband signal;

processing second RF signals on a second integrated circuit received from a second signal source to generate a second baseband signal;

providing phase-matched clock signals to the first and second integrated circuits for use in processing the RE signals;

combining the baseband signals to generate two or more data streams;

generating the matched clock signals from an off-chip crystal; and generating local-oscillator frequencies from the matched clock signals for use in processing the received RF signals, wherein generating the matched clock signals comprises:

receiving signals from the crystal with a clock driver on either the first or the second integrated circuit;

providing an output from the clock driver to an off-chip junction through a signal path; and providing the clock signals from the junction to the first and second integrated circuits through matched signal paths, wherein the two or more data streams were simultaneously transmitted by a multiple-output transmitting station with two or more antennas.

12. The method of claim 11 further comprising combining the baseband signals to generate two or more data streams, wherein the two or more data streams were simultaneously transmitted by a multiple-output transmitting station with two or more antennas.

13. The method of claim 12 further comprising:

generating the matched clock signals from the off-chip crystal; and generating local-oscillator frequencies from the matched clock signals for use in processing the received RE signals, wherein generating the matched clock signals comprises:

amplifying signals from the crystal with the clock driver; and providing signals from the clock driver to the first and second integrated circuits through the matched signal paths.

14. A method comprising:

processing first radio-frequency (RF) signals on a first integrated circuit received from a first signal source to generate a first baseband signal;

processing second RF signals on a second integrated circuit received from a second signal source to generate a second baseband signal;

providing phase-matched clock signals to the first and second integrated circuits for use in processing the RE signals;

combining the baseband signals to generate two or more data streams;

generating the matched clock signals from an off-chip crystal; and generating local-oscillator frequencies from the matched clock signals for use in processing the received RE signals, wherein generating the matched clock signals comprises:

receiving signals from the crystal at a first clock driver on the first integrated circuit;

receiving signals from the crystal at a second clock driver on the second integrated circuit;

combining output signals from first and second clock drivers with an averaging element to provide a clock signal output to an off-chip junction; and providing the matched clock signals from the junction to the first and second integrated circuits with a first pair of matched signal paths, wherein the two or more data streams were simultaneously transmitted by a multiple-output transmitting station with two or more antennas.

15. A system comprising:

two or more substantially onmidirectional antennas; and a multichip receiver comprising:

first receiver circuitry on a first integrated circuit to process first radio-frequency (RF) signals received from a first of the antennas;

second receiver circuitry on a second integrated circuit to process second RF signals received from a second of the antennas;

clock-signal generating circuitry to provide phase-matched clock signals to the first and second receiver circuitry; and baseband processing circuitry to combine signals from the first and second receiver circuitry to generate two or more data streams, the two or more data streams having been simultaneously transmitted by a multiple-output transmitting station with two or more antennas, wherein the clock-signal generating circuitry is to generate the clock signals from an off-chip crystal, wherein the first and second receiver circuitry generate phase-matched local-oscillator frequencies from the matched clock signals for use in processing the received RE signals, and wherein the clock-signal generating circuitry comprises:

a clock driver on either the first or the second integrated circuit to receive signals from the crystal;

a signal path to provide an output from the clock driver to an off-chip junction; and matched signal paths to provide the clock signals from the junction to the first and second integrated circuits.

16. The system of claim 15 wherein the receiver further comprises baseband processing circuitry to combine signals from the first and second receiver circuitry to generate two or more data streams, the two or more data streams having been simultaneously transmitted by a multiple-output transmitting station with two or more antennas.

17. The system of claim 16 wherein the clock-signal generating circuitry is to generate the clock signals from the off-chip crystal, wherein the first and second receiver circuitry generate phase-matched local-oscillator frequencies from the matched clock signals for use in processing the received RE signals, and wherein the clock-signal generating circuitry comprises:

the clock driver to receive signals from the crystal; and the matched signal paths to provide the clock signals from the clock driver to the first and second integrated circuits.

18. A system comprising:
two or more substantially onmidirectional antennas; and
a multichip receiver comprising:
first receiver circuitry on a first integrated circuit to process first radio-frequency (RF) signals received from a first of the antennas;
second receiver circuitry on a second integrated circuit to process second RE signals received from a second of the antennas;
clock-signal generating circuitry to provide phase-matched clock signals to the first and second receiver circuitry; and
baseband processing circuitry to combine signals from the first and second receiver circuitry to generate two or more data streams, the two or more data streams having been simultaneously transmitted by a multiple-output transmitting station with two or more antennas,
wherein the clock-signal generating circuitry is to generate the clock signals from an off-chip crystal,
wherein the first and second receiver circuitry generate phase-matched local-oscillator frequencies from the matched clock signals for use in processing the received RE signals, and
wherein the clock-signal generating circuitry comprises:
a first clock driver on the first integrated circuit to receive signals from the crystal;
a second clock driver on the second integrated circuit to receive signals from the crystal;
an averaging element to combine output signals from first and second clock drivers and provide a clock signal output to an off-chip junction; and
a first pair of matched signal paths to provide the clock signals from the junction to the first and second integrated circuits.

19. A computer readable medium that provides instructions, which when executed by one or more processors cause the one or more processors to perform operations comprising:
processing first radio-frequency (RF) signals on a first integrated circuit received from a first signal source to generate a first baseband signal;
processing second RF signals on a second integrated circuit received from a second signal source to generate a second baseband signal;
providing phase-matched clock signals to the first and second integrated circuits for use in processing the RF signals;
combining the baseband signals to generate two or more data streams;
generating the matched clock signals from an off-chip crystal; and
generating local-oscillator frequencies from the matched clock signals for use in processing the received RF signals,
wherein generating the matched clock signals comprises:
receiving signals from the crystal with a clock driver on either the first or the second integrated circuit;
providing an output from the clock driver to an off-chip junction through a signal path; and
providing the clock signals from the junction to the first and second integrated circuits through matched signal paths,
wherein the two or more data streams were simultaneously transmitted by a multiple-output transmitting station with two or more antennas 20. The computer readable medium of claim 19 wherein the instructions, when further executed cause the one or more processors to perform operations further comprising combining the baseband signals to generate two or more data streams,
wherein the two or more data streams were simultaneously transmitted by a multiple-output transmitting station with two or more antennas.

21. The computer readable medium of claim 20 wherein the instructions, when further executed cause the one or more processors to perform operations further comprising:
generating the matched clock signals from the off-chip crystal; and
generating local-oscillator frequencies from the matched clock signals for use in processing the received RF signals,
wherein generating the matched clock signals comprises:
amplifying signals from the crystal with the clock driver; and
providing signals from the clock driver to the first and second integrated circuits through the matched signal paths.

22. A computer readable medium that provides instructions, which when executed by one or more processors cause the one or more processors to perform operations comprising:
processing first radio-frequency (RF) signals on a first integrated circuit received from a first signal source to generate a first baseband signal;
processing second RF signals on a second integrated circuit received from a second signal source to generate a second baseband signal;
providing phase-matched clock signals to the first and second integrated circuits for use in processing the RE signals;
combining the baseband signals to generate two or more data streams;
generating the matched clock signals from an off-chip crystal; and
generating local-oscillator frequencies from the matched clock signals for use in processing the received RF signals,
wherein generating the matched clock signals comprises:
receiving signals from the crystal at a first clock driver on the first integrated circuit;
receiving signals from the crystal at a second clock driver on the second integrated circuit;
combining output signals from first and second clock drivers with an averaging element to provide a clock signal output to an off-chip junction; and
providing the matched clock signals from the junction to the first and second integrated circuits with a first pair of matched signal paths,
wherein the two or more data streams were simultaneously transmitted by a multiple-output transmilling station with two or more antennas.

23. A system comprising:
two or more substantially omnidirectional antennas; and
a multichip transmitter comprising:
first transmitter circuitry on a first integrated circuit to generate first radio-frequency (RF) signals for transmission by a first of the antennas;
second transmitter circuitry on a second integrated circuit to generate second RF signals for transmission by a second of the antennas; and
clock-signal generating circuitry to provide phase-matched clock signals to the first and second transmitter circuitry for use in generating the first and second RF signals by averaging clock output signals from the first and second integrated circuits, wherein the clock-signal generating circuitry is to generate the clock signals from an off-chip crystal, wherein the first and second transmitter circuitry generate phase-matched local-oscillator frequencies from the matched clock signals for use in generating the first and second RF signals for transmission, and wherein the clock-signal generating circuitry comprises:

a clock driver to receive signals from the crystal; and matched signal paths to provide the clock signals from the clock driver to the first and second integrated circuits, and wherein the clock-signal generating circuitry is to generate the clock signals from an off-chip crystal, wherein the first and second transmitter circuitry generate phase-matched local-oscillator frequencies from the matched clock signals for use in generating the first and second RF signals for transmission, and wherein the clock-signal generating circuitry comprises:

a clock driver on either the first or the second integrated circuit to receive signals from the crystal;

a signal path to provide an output from the clock driver to an off-chip junction; and matched signal paths to provide the clock signals from the junction to the first and second integrated circuits.

24. A multichip transmitter comprising:

first transmitter circuitry on a first integrated circuit to generate first radio-frequency (RF) signals for transmission by a first of a plurality of antennas;

second transmitter circuitry on a second integrated circuit to generate second RF signals for transmission by a second of the antennas; and clock-signal generating circuitry to provide phase-matched clock signals to the first and second transmitter circuitry for use in generating the first and second RE signals, wherein the clock-signal generating circuitry is to generate the clock signals from an off-chip crystal, wherein the first and second transmitter circuitry generate phase-matched local-oscillator frequencies from the matched clock signals for use in generating the first and second RF signals for transmission, and wherein the clock-signal generating circuitry comprises:

a clock driver on either the first or the second integrated circuit to receive signals from the crystal;

a signal path to provide an output from the clock driver to an off-chip junction; and matched signal paths to provide the clock signals from the junction to the first and second integrated circuits.

* * * * *

UNITED STATES PATENT AND TRADEMARK OFFICE
CERTIFICATE OF CORRECTION

| | | |
|---|---|---|
| PATENT NO. | : 7,609,792 B2 | Page 1 of 1 |
| APPLICATION NO. | : 11/069172 | |
| DATED | : October 27, 2009 | |
| INVENTOR(S) | : Georgios Palaskas et al. | |

It is certified that error appears in the above-identified patent and that said Letters Patent is hereby corrected as shown below:

In column 7, line 45, in Claim 1, delete "RE" and insert -- RF --, therefor.

In column 8, line 39, in Claim 8, after "and" insert -- the --.

In column 8, line 66, in Claim 9, after "and" insert -- the --.

In column 9, line 21, in Claim 11, delete "RE" and insert -- RF --, therefor.

In column 9, line 50, in Claim 13, delete "RE" and insert -- RF --, therefor.

In column 9, line 66, in Claim 14, delete "RE" and insert -- RF --, therefor.

In column 10, line 6, in Claim 14, delete "RE" and insert -- RF --, therefor.

In column 10, line 23, in Claim 15, delete "onmidirectional" and insert -- omnidirectional --, therefor.

In column 10, line 44, in Claim 15, delete "RE" and insert -- RF --, therefor.

In column 10, line 65, in Claim 17, delete "RE" and insert -- RF --, therefor.

In column 11, line 5, in Claim 18, delete "onmidirectional" and insert -- omnidirectional --, therefor.

In column 11, line 11, in Claim 18, delete "RE" and insert -- RF --, therefor.

In column 11, line 26, in Claim 18, delete "RE" and insert -- RF --, therefor.

In column 11, line 67, in Claim 19, after "antennas" insert -- . --.

In column 12, line 33, in Claim 22, delete "RE" and insert -- RF --, therefor.

In column 12, line 54, in Claim 22, delete "transmilling" and insert -- transmitting --, therefor.

In column 14, line 10, in Claim 24, delete "RE" and insert -- RF --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.         : 7,609,792 B2
APPLICATION NO.    : 11/069172
DATED              : October 27, 2009
INVENTOR(S)        : Palaskas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this

Twelfth Day of October, 2010

David J. Kappos
*Director of the United States Patent and Trademark Office*